June 9, 1936.  A. H. NEULAND  2,043,261
GEARING
Filed Dec. 30, 1932
Fig. 1.
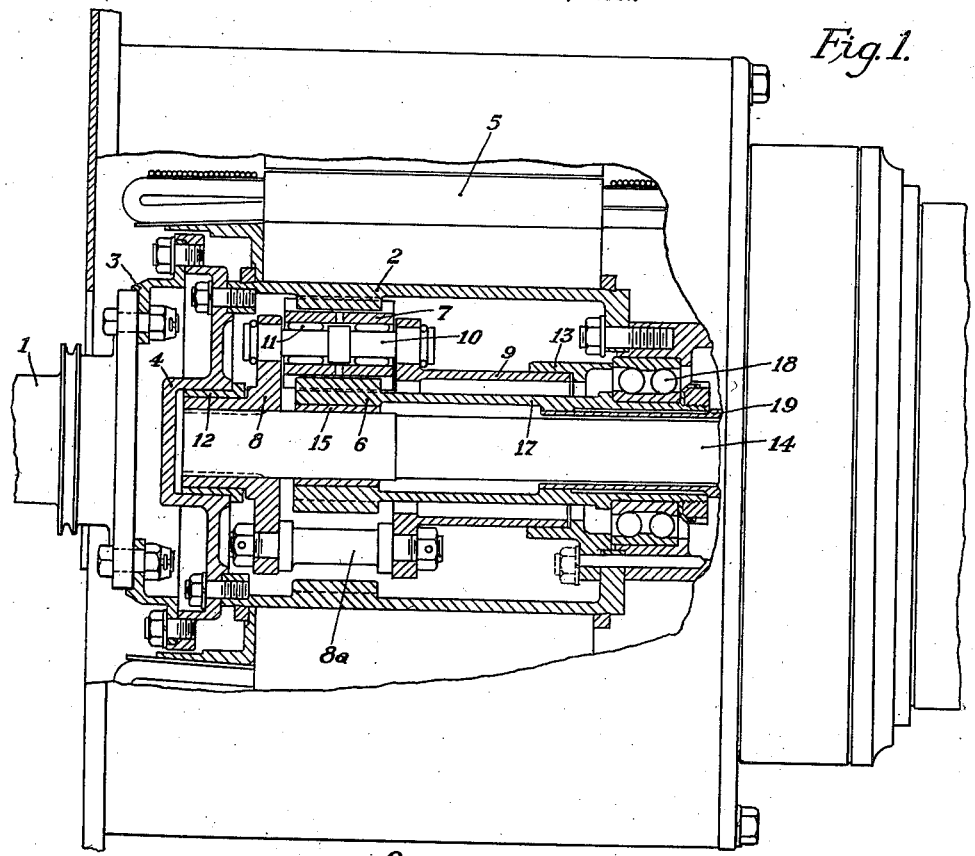
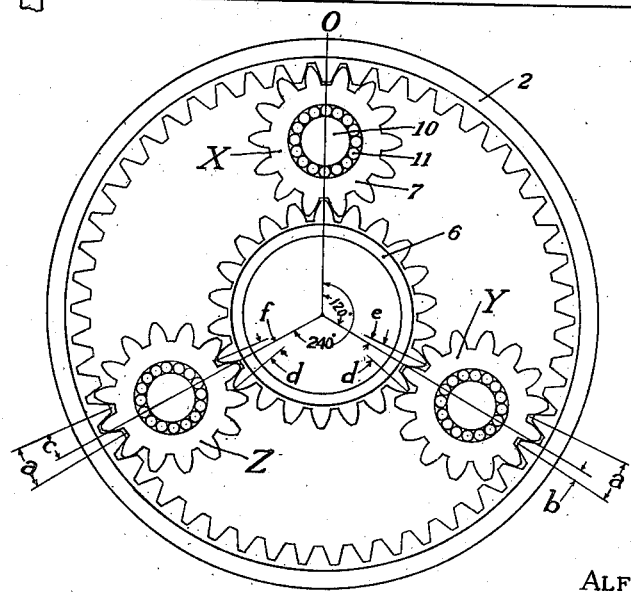
Fig. 2.
INVENTOR
ALFONS H. NEULAND
BY Ralph B. Stewart
ATTORNEY Patented June 9, 1936

2,043,261

UNITED STATES PATENT OFFICE 2,043,261

GEARING

Alfons H. Neuland, Irvington, N. J.

Application December 30, 1932, Serial No. 649,635

10 Claims. (Cl. 74—305)

It is well known that spur gears are noisy unless care is taken to have the tooth form true and accurate. However, wear over the surface of the gear teeth is not uniform since the sliding action is at a minimum at the pitch line and increases as the point of contact moves away from the pitch line towards the base and the ends of gear teeth, as a result of which the wear is not uniform over the tooth face. The tooth form becomes distorted, produces variations between the angular velocity of the gear teeth and results in noise and vibration.

The object of my invention is to maintain a greater uniformity of wear over the tooth face, and thereby reduce gear noise and vibration. My invention is particularly adapted to straight tooth spur or bevel gears, but may also be applied to helical or spiral gears.

An object of my invention is to provide an improved gearing particularly adapted for use in connection with differential gearing trains in which a plurality of planet gears connect the sun gears.

Other objects and advantages of my invention will appear from the following detailed description and drawing of a preferred embodiment of my invention which I have selected for illustration.

Fig. 1 is in part a longitudinal section and in part a side elevation of a transmission showing particularly the detailed construction of a planetary gearing suitable for use with my invention.

Fig. 2 is a section through the gearing and shows particularly one combination of teeth suitable for use in my invention.

Referring to the figures, 1 represents a crank shaft of a power source to which an internal sun gear 2 is secured by means of the drive flanges 3 and 4. An armature 5 of a dynamo may be built up on the outer periphery of the sun gear drum 2. A sun gear 6 is arranged concentrically within the sun gear 2. The planet gears 7 mesh with the sun gears 2 and 6 and are carried by the spider flanges 8 and 9 by means of the bearing pin 10 and needle rollers 11. The spider flanges 8 and 9 are suitably mounted in bearings 12 and 13 and are held in spaced relation by a number of spacer members 8a inserted between the planet gears. A load shaft 14 extends through the transmission, is splined within to the spider flange 8 and serves to journal sun gear 6 through the bearing 15. The sun gear has a tubular extension 17 supported by the ball bearing 18, and by means of a spline engages with a sleeve 19 to which a dynamo armature, not shown, may be connected.

This construction is described in my copending application Serial No. 652,037, filed January 16, 1933.

According to my invention, I provide a plurality of planet gears interposed between a pair of sun gears and select the relative numbers of teeth on the two sun gears in such a way as to establish a tooth contact between the sun gears and one of the planets with relation to the pitch line which differs from the contact with respect to the pitch line established between an adjacent planet gear.

I also provide a combination which maintains a contact at or near the pitch line between one of the planets and the sun gears. The pitch line contact shifts progressively from one planet gear to an adjacent planet gear and continues to shift until it has made a complete revolution and reached the first planet, during which cycle the first planet gear moves the distance of one tooth pitch.

This is accomplished by providing a number of teeth on the large sun gear which is greater than that determined by a given base ratio between the sun gears by 1, 2, 3, etc., and by providing a small sun gear with a correspondingly reduced number of teeth of that determined by said base ratio. For instance, assuming a base relationship of 48 and 24 teeth for the large and small sun gear, respectively, combinations suitable for the purposes of my invention can be had with a large sun gear having 49, 50, 51, etc. teeth and a small sun gear having 23, 22, 21, etc. teeth, respectively.

Suitable combinations can also be secured by providing the large sun gear with a lesser number of teeth determined by the base ratio, as, for instance, 47, 46, etc. However, in this case, the small sun gear must be provided with a greater number of teeth from that determined by the base ratio that is, with 25 teeth to correspond with a 47 tooth large sun gear, 26 teeth to correspond with a large sun gear having 46 teeth, etc., the criterion being that a reduction in the number of teeth on one gear from that determined by the base relationship must be accompanied by a corresponding increase in the number of teeth of the other sun gear from that determined by the base relationship. In selecting a base relationship the number of teeth on the two gears should differ from each other by an even number. It will be seen that for any combination which can be derived from any given base, the sum of the teeth on the two sun gears will be equal to the sum of the teeth given in the base.

The number of equally spaced planet gears that may be used is determined by the number of teeth in the sun gears comprising the base relationship, for instance, with the above base combination of 48 and 24 teeth, 2, 3, 4 or 6 planet gears may be used. In other words, the number of planets which may be used is a common factor of or must be divisible into the numbers of teeth on the two sun gears as given by the base relationship. Where the number of planets employed is even and the number of teeth on the sun gears is odd, or vice versa, pitch line contact will not occur at the same time for all planets. There will also be a progression of pitch line contact where the sun gear teeth are even and the number of planets employed is a multiple of an odd number such as six, and in such case pitch line contact by pairs of planets will progress around the sun gears. Where the number of teeth on the sun gears is odd and the number of planets is even, or vice versa, and where the number of teeth on the sun gear differs by one from the number given by the base relationship, the number of different points of pitch line contact occurring during the movement of the sun gear through one tooth pitch will be equal to the number of planets employed. In other words, in order to obtain pitch line contact at different times for all planets, the number of teeth employed on the sun gears and the number of planets employed must not be divisible by a common number. It will be seen that especially with the use of a large number of planets such as 6, in the above described example, with an odd number of teeth in the sun gears, the pitch line contact is made to gradually progress from one gear to the next and results in an arrangement in which there is practically a continuous pitch line contact between the two sun gears through the planets, and since there is no sliding motion between the gear teeth at the pitch line the wear at this point is a minimum. Any slight wear at the pitch line is accompanied by an increased load at points on both sides of the pitch line, but since the sliding motion increases on both sides of the pitch line, wear will be greater at these points, resulting in a tendency to correct any inaccuracies in tooth form, and once corrected, to maintain a true tooth form and thereby to maintain a uniform angular velocity and so prevent the development of noise and vibration in the gearing.

The combination illustrated in Fig. 2 has 50 teeth on the large sun gear and 22 teeth on the small sun gear with three planet gears, each having 14 teeth. It will be seen that the center line O passes through the center of the upper planet gear X and the tooth center of the large sun gear. The adjacent planet gear Y is spaced 120° from the planet X but has its center line lagging behind the tooth center of the sun gear 2 by the angle $b$ which is just one-third that of the pitch angle $a$. The center of the planet gear Z is spaced 240° from the planet X and has a lag between its center line and the center of the tooth of the sun gear $a$ by the angle $c$, being two-thirds that of the tooth pitch angle $(a)$. The resultant displacement between the centers of the planet gears and the tooth center of the small sun gear is similar to that with respect to the large sun gear except that the center of the planet gear Y is advanced beyond the tooth center of the small sun gear by the angle $e$ and the center of the planet gear Z is advanced by the angle $f$ beyond the center of the small sun gear being one-third and two thirds respectively of the tooth pitch angle $d$.

By reference to my copending application above identified it will be seen that the load shaft 14 is driven directly or by reaction from the sleeve 19 connected with sun gear 6. While I have shown and described my invention as embodied in an electro-mechanical transmission system, it will be understood that it may be used in any situation requiring the use of differential gearing. It will also be understood that the load shaft may be connected to one of the sun gears and the planetary gears employed as the reaction element, or the driving power may be applied to the planetary system and a load connected to each sun gear.

Having now described one embodiment of my invention I desire to have it understood that my invention is adapted for use in other embodiments and that only limitations required by the prior art or appended claims be imposed upon.

I claim:

1. A differential gear train comprising two sun gears having a plurality of equally spaced planet gears associated therewith, all of said gears having the same tooth pitch and the number of teeth on each said sun gear and the number of equally spaced planet gears being so chosen that one is odd and the other is even, and the number of teeth on either sun gear has no common factor with the number of planet gears.

2. A differential gear train comprising two sun gears and a plurality of equally spaced planet gears associated therewith, the number of teeth on one sun gear being greater by a given number than the number given by a selected base ratio and the number of teeth on the second sun gear being smaller by the same given number than the number given by the base ratio for the second gear, the two numbers in the base ratio differing from each other by an even number, the number of planet gears employed being divisible into the numbers forming the base ratio, and said given number and the number of planet gears have no common factor.

3. In combination, a driving gear, a driven gear, a plurality of intermediate gears meshing with said driving and driven gears and forming a plurality of driving connections between said driving and driven gears, the number of teeth on one of said driving or driven gears being greater by a given number than the number given by a selected base ratio, and the number of teeth on the other gear being less by the same given number than the number given by the base ratio for said other gear, the two numbers in the base ratio differing from each other by an even number, the number of intermediate gears being divisible into the numbers forming the base ratio, and said given number and the number of planets have no common factor.

4. A differential gear train comprising a large internal sun gear, a small external sun gear arranged within the large sun gear, and a plurality of equally spaced planet gears meshing with said sun gears, the number of teeth on one sun gear being greater by one than a multiple of the number of planet gears, the number of teeth on the other sun gear being less by one than a multiple of the number of planet gears, and each planet gear having a number of teeth equal to half the difference between the number of teeth on the two sun gears.

5. A differential gear train comprising a large internal sun gear, a small external sun gear arranged within the large sun gear, and a plurality of equally spaced planet gears meshing with said sun gears, the number of teeth on one sun gear being greater by one than a multiple of the number of planet gears, the number of teeth on the other sun gear being less by one than a multiple of the number of planet gears, all of said gears having the same tooth pitch.

6. A differential gear train comprising two sun gears having a plurality of evenly spaced planet gears associated therewith, the number of teeth on the sun gears and on the planet gears being so chosen that the sum of the number of teeth on one sun gear plus twice the number of teeth on one planet gear equals the number of teeth on the other sun gear and so that the number of teeth on one sun gear has no common factor with the number of teeth on the other sun gear.

7. A differential gear train comprising a large internal sun gear, a small external sun gear arranged within the large sun gear, and a plurality of equally spaced planet gears meshing with said sun gears, the number of teeth on the sun gears and on the planet gears being so chosen that the sum of the number of teeth on the small sun gear plus twice the number of teeth on one planet gear equals the number of teeth on the large sun gear and so that the number of teeth on one sun gear has no common factor with the number of teeth on the other sun gear.

8. A differential gear train comprising a large internal sun gear, a small external sun gear arranged within the large sun gear, and a plurality of equally spaced planet gears meshing with said sun gears, all of said gears having the same tooth pitch and the number of teeth on each sun gear and the number of equally spaced planet gears being so chosen that one is odd and the other is even, and the number of teeth on either sun gear has no common factor with the number of planet gears.

9. A differential gear train comprising a large internal sun gear, a small external sun gear arranged within the large sun gear, and a plurality of equally spaced planet gears meshing with said sun gears, the number of teeth on one sun gear being greater by a given number than the number given by a selected base ratio and the number of teeth on the second sun gear being smaller by the same given number than the number given by the base ratio for the second gear, the two numbers in the base ratio differing from each other by an even number, and the number of planet gears employed being divisible into the numbers forming the base ratio.

10. A differential gear train comprising a large internal sun gear, a small external sun gear arranged within the large sun gear, and a plurality of equally spaced planet gears meshing with said sun gears, said planet gears being arranged in diametrically opposed pairs, the number of teeth on one sun gear being greater by one than a multiple of the number of pairs of planet gears, the number of teeth on the other sun gear being less by one than a multiple of the number of pairs of planet gears, and each planet gear having a number of teeth equal to half the difference between the number of teeth on the two sun gears.

ALFONS H. NEULAND.